United States Patent Office.

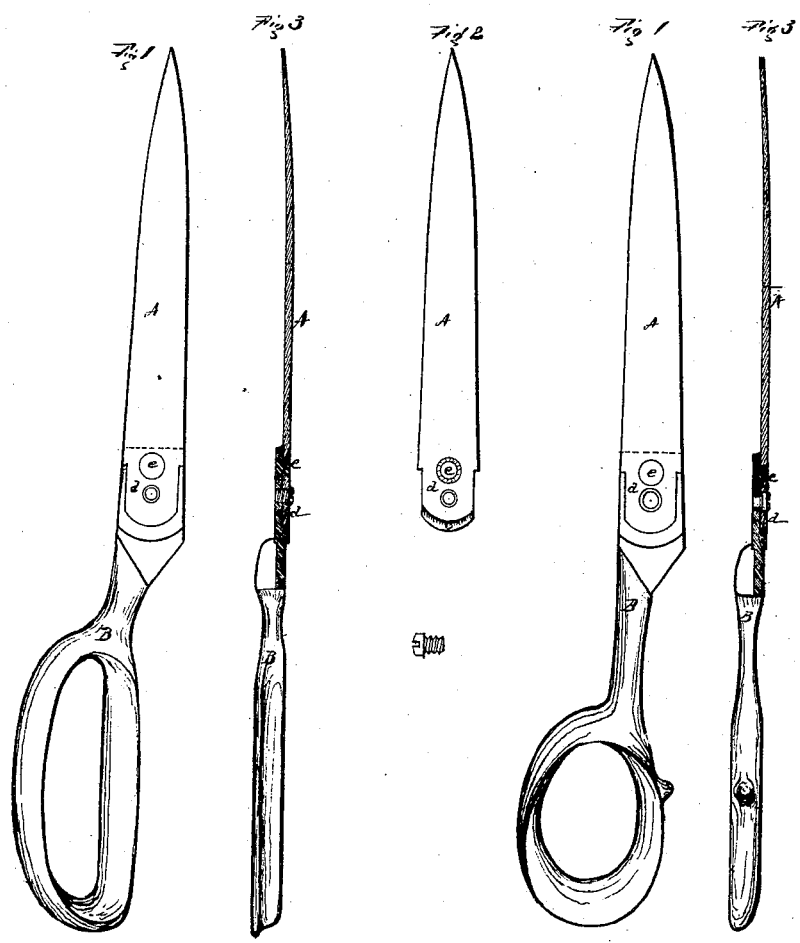

JOSEPH RYALS, OF TERRYVILLE, CONNECTICUT.

Letters Patent No. 102,437, dated April 26, 1870.

IMPROVEMENT IN MANUFACTURE OF SHEARS.

The Schedule referred to in these Letters Patent and making part of the same.

*To all whom it may concern:*

Be it known that I, JOSEPH RYALS, of Terryville, in the county of Litchfield and State of Connecticut, have invented a new and useful Improvement in the Manufacture of Shears; and I do hereby declare that the following is a full and exact description thereof, reference being had to the accompanying drawings and to the letters of reference marked thereon, making a part of this specification.

This invention relates to a new and improved method of constructing shears, so that the blades of the shears may be substantially and cheaply attached to the handles; and consists in casting the handles onto the blades.

In the accompanying sheet of drawings—

Figure 1 represents side views of my shears, showing the blades attached to the handles;

Figure 2, a blade detached from the handle;

Figure 3, an edge view of the blade and handle, connected or attached; and

Figure 4, the shears completed.

Similar letters of reference indicate corresponding parts in the several drawings.

A is a steel blade, and may be of any shape and size desired, and

B, the handle cast onto the blade.

The blade A, after being cut to the proper size and shape, as shown in fig. 2, by swaging or otherwise, the end *d* of the blade is inserted into a mold previously formed for casting the handle, so that when the molten metal is poured into the mold it will surround that part of the blade designed to be affixed to the handle, and at the same time cover the beveled edges *c* of the same in such manner as, when the metal forming the handle becomes cold, the blade of the shears will be fixed to the handle; a much stronger and better manner than as in scissors as now constructed. The end of the blade to be affixed to the handle may be dovetailed, and thus tend more strongly to keep the blade and handle together.

The particular advantages of constructing shears in this way are that heretofore it has been necessary to form the handles of shears of malleable iron, so that the blades or handles could be welded or riveted together, which was not only expensive in the material thus used, but also in the time consumed in making a pair of shears, whereas with my invention the handles of shears may be made of any cast metal, even of the cheapest kind, and yet the shears will be as strong and useful, and present a neater appearance than do shears as now made.

The moment the metal forming the handles becomes cold, my shears are, with the exception of a little dressing on an emery-wheel and inserting the pivot-screw, complete and ready for use without any further manipulation.

The advantages of my invention being thus apparent, and having fully described it,

What I claim as new, and desire to secure by Letters Patent, is—

The handles or parts B of scissors and shears, cast onto the blades A, the cast metal inclosing the end of the blade, substantially as herein described and shown.

JOSEPH RYALS.

Witnesses:
 CHARLES CARTER,
 ALEXANDER POND.